Patented Feb. 23, 1926.

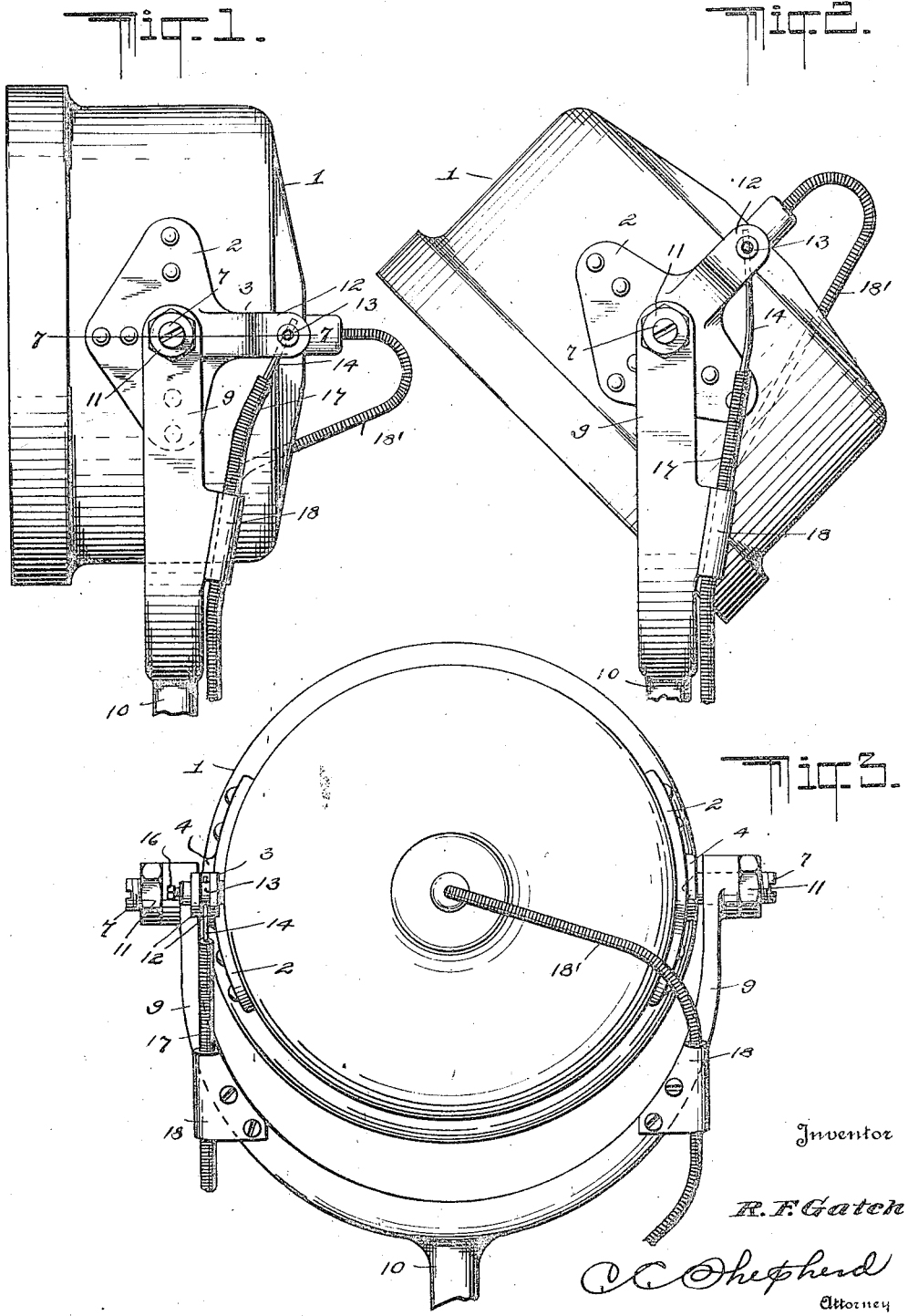

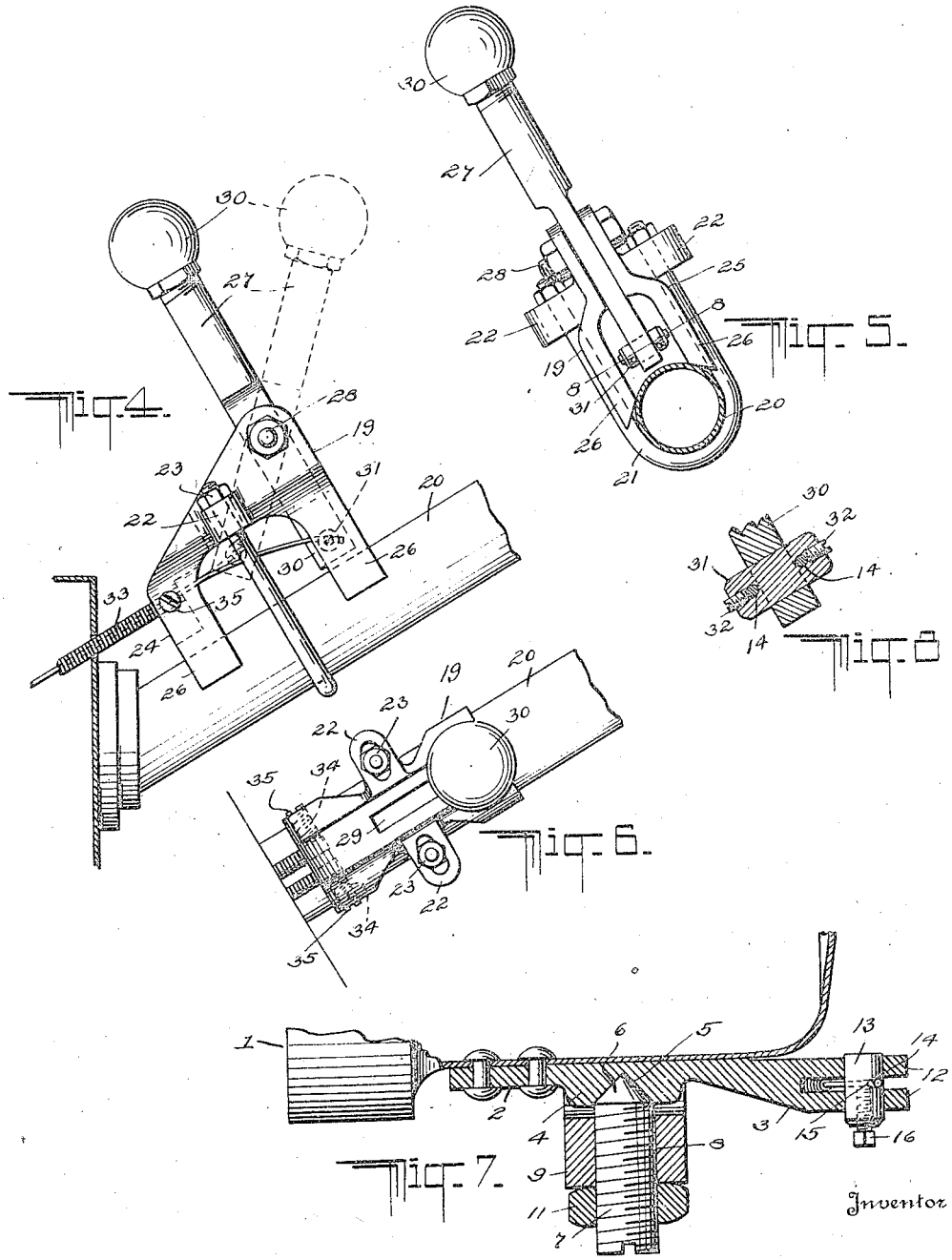

1,573,822

UNITED STATES PATENT OFFICE.

ROBERT F. GATCH, OF COLUMBUS, OHIO

VEHICLE LIGHT.

Application filed June 14, 1924. Serial No. 719,988.

*To all whom it may concern:*

Be it known that I, ROBERT F. GATCH, a citizen of the United States, residing at Columbus, in the county of Franklin and State of Ohio, have invented certain new and useful Improvements in Vehicle Lights, of which the following is a specification.

My invention relates generally to vehicle lights and more particularly to a novel tilting mechanism for vehicle lights.

An object of my invention is to provide a device of this character in which the light is capable of attachment to any desired part of a vehicle and in which the tilting mechanism for the light is capable of operation from any desired point convenient to the driver.

Another object of my invention is to provide a light tilting mechanism comprising few and simple parts which is positive in its operation.

A further object of my invention is to provide a device of this character wherein a single member having its ends pivotally secured to the light and to the operating lever respectively causes the light to tilt in a vertical plane upon movement of the lever regardless of the relative location of the light and lever.

With these and other objects in view which will become apparent as the description proceeds, my invention consists in the novel features of construction, combinations of elements and arrangements of parts hereinafter to be fully described and claimed in the accompanying drawing forming a part of the specification.

Figure 1 is a side elevation of a vehicle light and a portion of the supporting bracket showing a portion of the tilting mechanism of my invention, Figure 2 is a similar view showing the light in tilted position, Figure 3 is a rear elevation thereof, Figure 4 is a side elevation showing a portion of the lamp tilting device mounted on the steering column of a motor vehicle, Figure 5 is an end view thereof, Figure 6 is a top plan view of the device, Figure 7 is a sectional view taken on the line 7—7 of Figure 1, and Figure 8 is a detail sectional view taken on the line 8—8 of Figure 5.

Referring to the specific embodiment of my invention illustrated in the accompanying drawing wherein like reference numerals designate like and similar parts throughout the several views, 1 designates the body of a vehicle light of conventional design, to opposite sides of which are secured the plates 2, one of which has a rearwardly extending arm 3. Outwardly extending bosses 4, having centrally disposed recesses 5 therein to receive the tapered points 6 of the set screws 7, are provided on the plates 2.

The set screws 7 engage in the aligned threaded apertures 8 of the spaced spring arms 9 of the supporting bracket 10 and seat in the recesses 5 to provide a pivotal mounting for the body 1, the lock nuts 11 serving to hold the set screws in adjusted position.

The free end of the arm 3 is bifurcated to provide the spaced arms 12 which are apertured to receive the cylindrical pin 13. The end of the operating rod or wire 14 is passed through aperture 15 and secured in position by set screw 16. It will be observed that by this construction the wire 14 is firmly held in position between the arms 12 and thus prevents the pin from pulling out of its bearings in the arm 3 and permits it to turn in the arm upon operation of the wire.

In order that the operating wire 14 may move freely in whatever position it may be installed it is encased in the flexible steel spring tubing 17 which is secured to the bracket 10 and may be secured to the body of the vehicle wherever it is desired by sheet steel clamps 18. The flexible armored cable 18' carrying current to the light is secured to the bracket and vehicle body in a similar manner.

I have shown the cast bracket 19 secured on the steering post 20 by the U bolt 21 passing around the post with its ends protruding through the laterally extending ears 22 to receive the nuts 23 for fastening the bracket in position, but it is obvious that it could be secured at any other point convenient to the driver.

The bracket 19 comprises a substantially U shaped portion 24 and a higher portion 25 which is bifurcated to provide the spaced arms 26. The operating lever 27 is pivotally mounted intermediate of its ends on the bolt 28 passing through aligned apertures in the arms 26 and the interior of the bracket is cut away to provide the space 29 within which the lower end 30 of the lever moves. The operating handle 31 is provided on the upper end of the lever 27 and the lower end 30 is apertured to receive the cylindrical pin 31. Set screws 32 serve to hold the wires 14, passing through pins 31, in position and the wires 14 prevent the pin from moving from its bearing in the lever 27.

If the lever 27 is to control only one light the wire 14 is pivotally connected to the lever in the same manner in which its other end is connected to the arm 3. The ends 33 of the spring tubing 17, which encloses the operating wire 14 between the brackets 10 and 19, are inserted within the apertures 34 in the portion 24 and are secured in position by the headless set screws 35.

It is obvious to those skilled in the art that I have provided a light tilting mechanism which may be easily and quickly installed upon a motor vehicle without marring the vehicle in any way and may be used to operate the head lights or a single light mounted at any desired point on the vehicle.

While I have illustrated my invention in but one specific embodiment thereof it is clearly susceptible of various minor changes and modifications without departing from the spirit thereof, and I desire, therefore, that only such restrictions shall be placed thereupon as are imposed by the prior art or are specifically set forth in the appended claims.

What is claimed is:

1. In a vehicle lamp, a vertically tiltable lamp casing, plates secured to said casing upon opposite sides of the same and reinforcing said casing at the pivotal points thereof, one of said plates being provided with a laterally disposed crank extension having the outer end thereof terminated in spaced apertured ears, a pin arranged to be positioned in the apertures of said ears, and an operating wire for tilting said casing having one end thereof secured to said pin between said ears and serving to lock the pin in its operative position.

2. In a vehicle lamp, a vertically tiltable lamp casing, reinforcing plates applied to the opposite sides of said casing adjacent to the pivotal points thereof, one of said plates being provided with a laterally extending crank extension which has the outer end thereof terminated in spaced apertured ears, a pin occupying the apertures in said ears and provided with a transverse opening, an operating wire for tilting said casing having the outer end thereof passed through the opening in said pin and situated between said ears to hold said pin in its applied position, and a clamping device entering said pin to frictionally hold the end of the operating wire in the opening in said pin.

In testimony whereof I affix my signature.

ROBERT F. GATCH.